Feb. 23, 1971  L. B. BATTA  3,564,816
SELECTIVE ADSORPTION PROCESS
Filed Dec. 30, 1968  6 Sheets-Sheet 1

INVENTOR
LOUIS BELA BATTA
BY John C. Le Fever
ATTORNEY

Feb. 23, 1971  L. B. BATTA  3,564,816
SELECTIVE ADSORPTION PROCESS
Filed Dec. 30, 1968  6 Sheets-Sheet 2

FIG. 2.

| CYCLE TIME MINUTES | ADSORBER | | | |
|---|---|---|---|---|
| | BED A | BED B | BED C | BED D |
| 0 TO 1 | ADSORPTION | COUNTERCURRENT DEPRESS. | PRESSURE EQUAL. I | REPRESSURIZATION |
| 1 TO 4 | ADSORPTION | PURGE | COCURRENT DEPRESS. | REPRESSURIZATION |
| 4 TO 6 | ADSORPTION | REPRESSURIZATION | PRESSURE EQUAL. II | REPRESSURIZATION |
| 6 TO 7 | PRESSURE EQUAL. I | REPRESSURIZATION | COUNTERCURRENT DEPRESS. | ADSORPTION |
| 7 TO 11 | COCURRENT DEPRESS. | REPRESSURIZATION | PURGE | ADSORPTION |
| 11 TO 12 | PRESSURE EQUAL. II | REPRESSURIZATION | REPRESSURIZATION | PRESSURE EQUAL. I |
| 12 TO 13 | COUNTERCURRENT DEPRESS. | ADSORPTION | REPRESSURIZATION | COCURRENT DEPRESS. |
| 13 TO 17 | PURGE | ADSORPTION | REPRESSURIZATION | PRESSURE EQUAL. II |
| 17 TO 18 | REPRESSURIZATION | ADSORPTION | REPRESSURIZATION | COUNTERCURRENT DEPRESS. |
| 18 TO 19 | REPRESSURIZATION | PRESSURE EQUAL. I | ADSORPTION | PURGE |
| 19 TO 23 | REPRESSURIZATION | COCURRENT DEPRESS. | ADSORPTION | PURGE |
| 23 TO 24 | REPRESSURIZATION | PRESSURE EQUAL. II | ADSORPTION | REPRESSURIZATION |

INVENTOR
LOUIS BELA BATTA
BY
ATTORNEY

INVENTOR
LOUIS BELA BATTA
BY John C. ...
ATTORNEY

FIG. 7.

3,564,816
SELECTIVE ADSORPTION PROCESS
Louis Bela Batta, Grand Island, N.Y., assignor to Union Carbide Corporation, New York, N.Y., a corporation of New York
Filed Dec. 30, 1968, Ser. No. 787,847
Int. Cl. B01d *53/04*
U.S. Cl. 55—26    9 Claims

ABSTRACT OF THE DISCLOSURE

A pressure swing adsorption process for separation of gas mixtures in which at least four adsorbent beds are joined so that the adsorbate loaded bed is pressure equalized with two other beds in staged sequence.

BACKGROUND OF THE INVENTION

This invention relates to a process for separating gas mixtures having selectively adsorbable components, as for example, CO, $CO_2$, $CH_4$ and other light saturated or unsaturated hydrocarbons, $NH_3$, $H_2S$, A, $N_2$ and $H_2O$ from hydrogen, and $O_2$ $N_2$ and $CO_2$ from air.

Pressure swing adsorption processes are well known for separating gas mixtures having selectively adsorbable components. One of the important limitations of these previous processes is the absence of an efficient low cost method to utilize the void space gas present in the adsorbent bed between the individual particles at the end of the adsorption step. When the adsorbent is loaded to equilibrium this void space gas is essentially at feed conditions with respect to both unadsorbable product effluent content and pressure, so that it has value. Moreover, it may have been preliminarily purified or dried, heated or cooled, and otherwise processed in preparation for separation in the pressure swing adsorption system.

U.S. Pat. No. 3,176,444 to Kiyonage teaches that the product values in the void space gas may be recovered by continuing the adsorption through a cocurrent depressurization step so that the adsorption front moves toward the bed discharge end during the latter step. Extra adsorbent must be provided in the discharge end and the product-quality gas thus withdrawn at reduced pressure must be recompressed to join the higher pressure product. This method increases the product recovery but requires additional equipment and power.

U.S. Pat. No. 3,142,547 to Marsh et al., offers a system for utilization of part of the void space gas without recompression. This is accomplished by storing the lower pressure product from the cocurrent depressurization step in a surge vessel until it may be employed for purge. However, this system requires a large additional vessel for low pressure gas storage, together with its associated piping and valving. Moreover, it is limited in quantity of void gas recovery to that which can be blown down before pressure equalization occurs between the adsorption bed and the surge tank.

Copending patent application Ser. No. 659,381 filed Aug. 9, 1967, in the name of J. L. Wagner and issued Mar. 4, 1969, as U.S. Pat. No. 3,430,418, describes another method for more effective utilization of the void space gas wherein at least four adsorbent beds are provided and operated so that when a first bed is on the cocurrent depressurization step, a different bed is always on the purge step. The low pressure product can be used immediately as purge without intermediate storage. Also, according to the Wagner invention, an additional quantity of product gas from the cocurrent depressurization step is used to partially repressurize a previously purged second bed by pressure equalization therewith. In this manner both the pressure value and the product purity value of separated void space gas are utilized, and higher product purity and recovery is achieved by the Wagner invention than other commercially employed systems.

Still further improvement in product purity and recovery is however desirable, particularly where the feed gas is costly, as for example dissociated ammonia containing hydrogen to be separated, or where high recovery is particularly important as for example oxygen from compressed air.

It is an object of this invention to provide a pressure swing process which affords very high recovery of product (in terms of volume) from the feed gas.

Another object is to provide a process capable of high recovery of product at high purity.

A further object is to provide a pressure swing adsorption process affording improved utilization of the void space gas remaining in the bed after the adsorption step.

Other objects and advantages of this invention will be apparent from the ensuing disclosure and appended claims.

SUMMARY

This invention relates to a pressure swing process for adsorbing at least one selectively adsorbable component from the feed gas mixture.

At least four beds of selective adsorbent material are provided, each with an inlet end and discharge end. This process may be generally classified as the partial adsorbate loading, cocurrent depressurization type wherein the feed gas mixture is introduced to the first bed inlet end at a first highest superatmospheric pressure for flow therethrough with selective adsorption of at least one component, and for discharge of unadsorbed product effluent from the discharge end. This flow is continued so that an adsorption front of the one component is established at the inlet end and moves progressively toward the discharge end as the absorbate loading increases. Flow is terminated when the adsorption front is still entirely within the first bed—before breakthrough. This means that the bed is only partially loaded with adsorbate, and the section between the front and the discharge end is substantially free and clean of the adsorbate.

This invention employs certain steps of the aforementioned Wagner invention wherein a part of the void space gas is released from the first bed discharge end and introduced to the discharge end of a second adsorbent bed previously cleaned of the one adsorbable gas component. This second bed is initially at a lower pressure and flow is continued until the first and second beds are pressure equalized at an intermediate pressure. Further void space gas is released from the first bed discharge end for cocurrent depressurization thereof, and the so-released gas is introduced at the lowest pressure of the process to the discharge end of another adsorbent bed partially loaded with the adsorbable one component for purging of such bed. The first bed is itself thereafter countercurrently purged by cocurrent depressurization gas from still another adsorbent bed and at the lowest pressure, for desorption of the one component and removal through the bed's inlet end. According to the Wagner invention the purged first bed is countercurrently repressurized by introducing void space gas from the second bed and product effluent from the other bed.

In the present invention, the improvement includes first pressure equalizing the first bed with a different bed at higher intermediate pressure by releasing void space gas from the first bed discharge end and flowing same to the different bed discharge end, such bed having previously been repressurized to lower intermediate pressure. A second pressure equalizing step follows wherein additional void space gas is released from the first bed discharge end and flowed either cocurrently or countercurrently to a still different bed immediately after the one adsorbable component has been purged therefrom at the lowest pressure. This flow continues until the two beds are equalized at lower intermediate pressure. The first bed is then purged with cocurrent depressurization gas and countercurrently repressurized prior to resumption of the adsorption step.

A further portion of void space gas is released from the first bed by cocurrent depressurization, either before or after the aforementioned second pressure equalizing step. This further portion is preferably withdrawn after the second pressure equalization and used to purge the other adsorbent bed at the lowest pressure of the process.

This process has been used to separate gas mixtures containing hydrogen as the major component along with selectively adsorbable minor components such as light aliphatic hydrocarbons. The process has provided even higher product recovery with high purity than attained by the single step pressure equalization of the Wagner process described in patent application Ser. No. 659,381.

DESCRIPTION OF THE PREFERRED EMBODIMENTS

Figure 1:
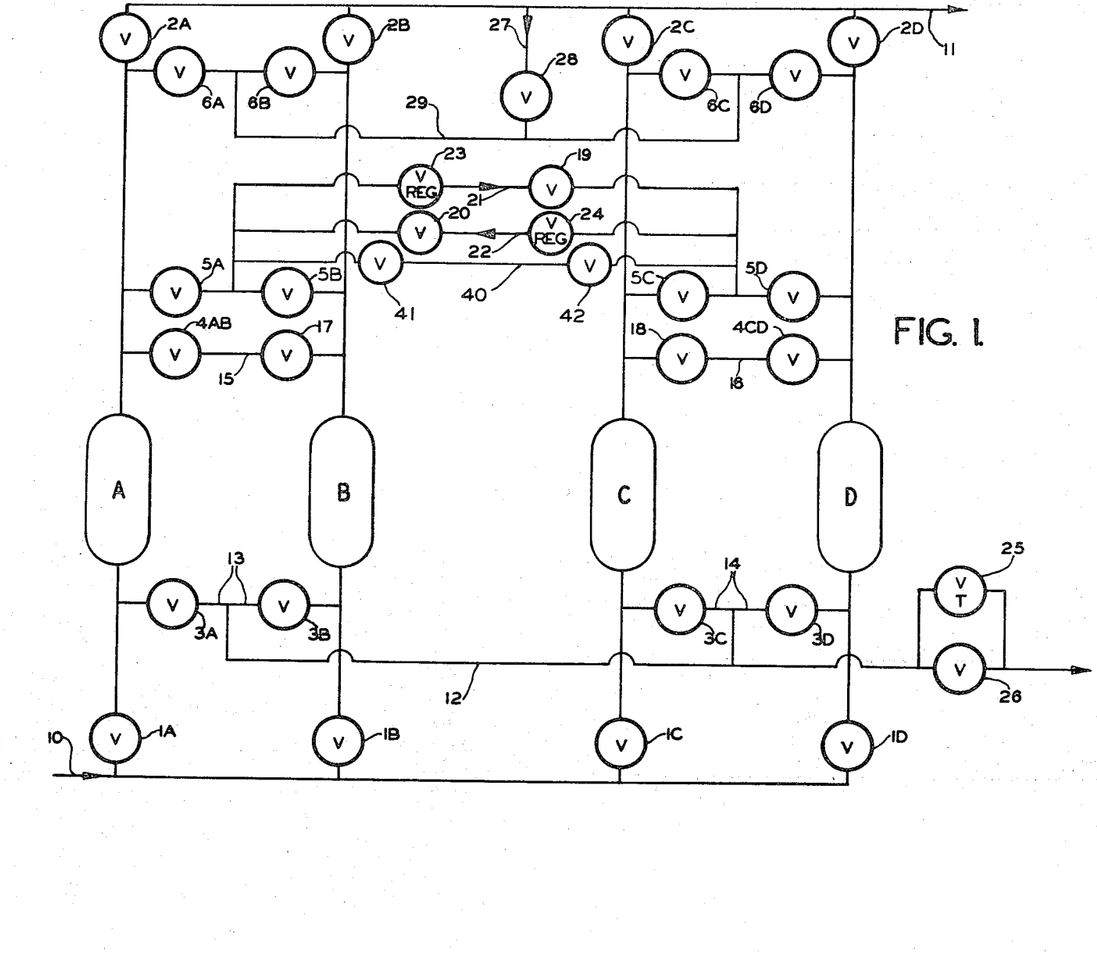
FIG. 1 is a schematic flowsheet of apparatus suitable for practicing the inventive process with four adsorbent beds.

Referring now to the drawings FIG. 1 shows four adsorbent beds, A, B, C and D connected in parallel flow relation between feed gas mixture manifold 10 and unadsorbed product effluent gas manifold 11. Automatic valves 1A, 1B, 1C and 1D direct feed gas flow respectively to first bed A, second bed B, third bed C (equivalent to the "other" bed in the summary) and fourth bed D (equivalent to "still another" bed in the summary). Automatic valves 2A, 2B, 2C and 2D, respectively, direct product gas from the same beds into product manifold 11.

The adsorbed components are rejected by countercurrent depressurization and purge through waste manifold 12 at the inlet end of the beds. Adsorbers A and B are joined at their inlet ends to waste manifold 12 by conduit 13 having automatic valves 3A and 3B therein. Similarly adsorbers C and D are joined to waste manifold 12 at their inlet ends by conduit 14 having automatic valves 3C and 3D therein.

First stage equalization conduit 15 is provided joining the discharge ends of adsorbers A and B; similarly first stage equalization conduit 16 is provided joining the discharge ends of adsorbers C and D. To provide first stage pressure equalization, automatic valves 4AB and 4CD are located in conduits 15 and 16, respectively. Valves 17 and 18 in series with equalization valves 4AB and 4CD, respectively, are manual preset throttling devices which prevent excessively high flow rates from occurring and which allow adjustment and balancing of equalization rates between the adsorption bed pairs AB and CD.

Automatic valves 5A, 5B, 5C and 5D are provided at the discharge ends of the beds, two of which open together to pass cocurrent depressurization gas from one adsorbent bed for use as purge gas in another bed. Manual valves 19 and 20 in the purge cross-over conduits 21 and 22 respectively serve the same purpose as explained previously for valves 17 and 18 in the first stage pressure equalization circuit. The purge cross-over conduits 21 and 22 (piped in parallel flow relation) also contain back pressure regulators 23 and 24 oriented in opposite flow directions so as to control flow in either direction between either bed A or B and bed C or D. The back pressure regulators 23 and 24 are set to maintain a minimum pressure, e.g., 50 p.s.i., in the bed undergoing cocurrent dperessurization. When this pressure is reached the cocurrent depressurization and purge steps terminate. This arrangement prevents extension of cocurrent depressurization to excessively low pressure with resultant breakthrough of the one component's adsorption front.

As previously indicated, valves 17, 18, 19 and 20 are flow rate limiting devices which prevent bed damage due to excessive ΔP and fluid velocity. A similar precaution may be followed during countercurrent depressurization, by means of preset throttle valve 25 which acts as a bypass around main waste valve 26 in waste conduit 12. During countercurrent depressurization the automatic main waste valve 26 is closed which forces the gas to follow the bypass route through valve 25. During the following lowest pressure purge step, valve 26 opens to minimize flow resistance in the waste conduit 12.

Repressurization conduit 27 having constant flow control valve 28 therein joins product manifold 11 for introduction of unadsorbed product effluent from ine adsorber (on the absorption step) to a different adsorber having been partially repressurized to lower intermediate pressure. Conduit 27 in turn joins product return conduit 29 communicating with repressurization valves 6A–6D joining the prdouct conduits to adsorbers A–D respectively.

Second stage pressure equalization conduit 40 communicates at opposite ends with the bed A discharge end through valve 5A, bed B discharge end through valve 5B, bed C discharge end through valve 5C and bed D discharge end through 5D. Flow conduit 41 is controlled by valves 41 and 42.

It has been previously indicated that the adsorption step is terminated when the adsorption front of the selected component is entirely within the bed. This point may be determined in a manner well known to those skilled in the art, using the feed conditions and composition, and the adsorbent's capacity and dynamic characteristics. Also the first pressure equalization step and the cocurrent depressurization step are stopped when the adsorption front is still entirely within the bed and before breakthrough. This permits removal of the adsorbables from the void space gas by the bed discharge end, so that the emerging equalization gas and the purge gas have virtually the same purity as the product gas. If the cocurrent depressurization step is conducted before the second equalization step then all void gas recovery steps must be completed while the adsorption front is still entirely within the source bed. If the second equalization step is carried out after the cocurrent depressurization step, the former may continue past the breakthrough point as the emerging gas is used for feed end repressurization. Breakthrough may for example be identified by monitoring the adsorbable concentration in the discharge gas, and detecting the moment at which this concentration appreciably increases. The purge step is most efficiently performed by removing only the adsorbables deposited in the preceding step. That is, the bed is not completely cleaned of all adsorbables by the purge fluid, but the latter's counter-current flow insures that the adsorption front is pushed back towards the inlet end. This insures a clean product during even the initial portion of the succeeding adsorption step.

In most uses, the process removes more than one adsorbable component from the feed gas, and the system may be designed to separate the component least strongly held by the adsorbent.

Figure 2:
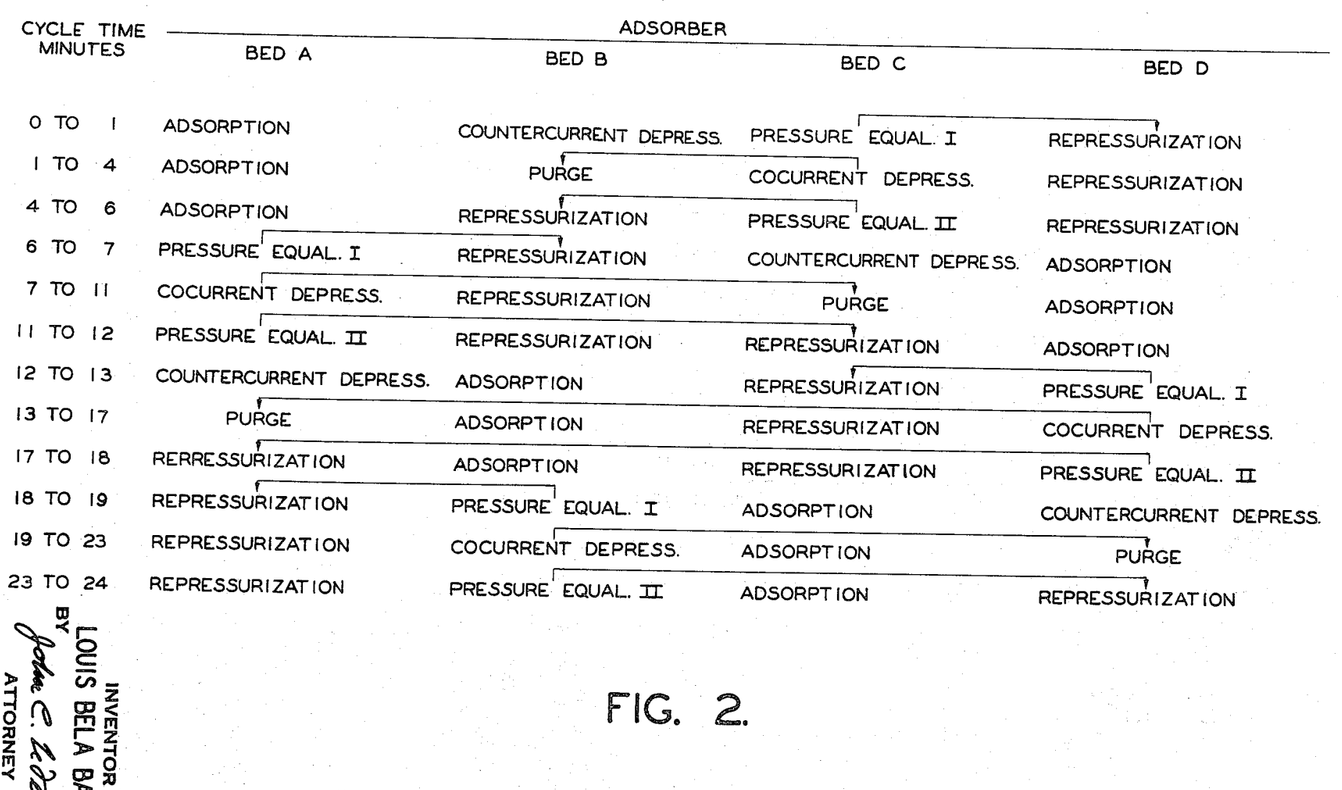
FIG. 2 is a preferred cycle and time program for various steps of a four bed embodiment of this process which can be practiced with the FIG. 1 system.

The use of the FIG. 1 system to practice the preferred four-bed embodiment will be more easily understood by reference to the FIG. 2 cycle and time program. There are six distinct steps each involving commencement and/ or termination of flows. Streams flowing into and out of the four-bed system are indicated by vertical lines connecting the feed manifold 10, the unadsorbed product effluent manifold 11 and the desorbate waste manifold 12. The feed manifold 10 connects vertically with each of the four adsorption steps and the latter in turn join vertically with the product manifold 11. The countercurrent depressurization and purge steps, during which the adsorbed component is discharged from the beds, are connected vertically with the desorbate waste manifold 12. The repressurization steps which use a portion of the unadsorbed product effluent are connected vertically with the product manifold 11. All gas flows associated with the four beds are identified on the figure.

At least four adsorbent beds are needed to match, timewise, those steps in which cocurrent depressurization streams become available with those steps which can utilize these streams. Otherwise large holdup tanks would be required. It will be apparent from FIG. 2 that at any moment of time, one of the adsorbent beds is on its adsorption step delivering product at substantially constant pressure to the product manifold 11. At the same moment the other three beds are being cocurrently depressurized, or first or second stage pressure equalized, cleaned of the adsorbed component and/or repressurized respectively for the succeeding adsorption step. One of the beds is always receiving product gas for repressurization so that the consumption of product for this purpose is continuous rather than intermittent.

In this particular cycle and in terms of any single bed, adsorption accounts for ¼ of the total cycle, first and second pressure equalization and cocurrent depressurization account for ¼, countercurrent depressurization and purge for about ⅙, and repressurization for the remaining ⅓. The utilization within the system of the pressure equalization and cocurrent depressurization gas is indicated by horizontal flow lines. Each first (I) pressure equalization step is connected horizontally with a repressurization step in another bed having already been partially repressurized, and each second (II) pressure equalization step is connected horizontally with a repressurization step of a different bed having just been purged. Each cocurrent depressurization step is connected horizontally with a purge step in a different bed.

Each step in the cycle of bed A will now be outlined and related to those components of FIG. 1 which are involved in the cycle changes. Pressures illustrative of such operation are included. Although a total time cycle of 24 minutes is shown in FIG. 2 for simplicity, it is preferred to use substantially shorter cycles. For example, a 12 minute total cycle might be used for which each period of FIG. 2 may be shortened to one-half the time indicated.

Time 0–6: Bed A is on adsorption at 55 p.s.i.g. Valves 1A and 2A are open and valves 3A, 4AB, and 5A and 6A are closed.

Time 6–7: At the end of the adsorption step, valves 1A and 2A close and valve 4AB opens to commence first stage pressure equalization between beds A and second bed B. At this moment, all other valves associated with bed B are closed except valve 6B (valves 1B, 2B, 3B and 5B). Valve 17 limits the flow rate of equalization gas to avoid bed fluidization, the direction being countercurrent to feed gas flow in bed B.

Time 7–11: When pressures in bed A and B have equalized at a higher intermediate level of about 32 p.s.i.g., valve 4AB closes and valves 5A, 19 and 5C open allowing purge gas to flow from bed A into third bed C countercurrent to feed gas flow. At this moment, all other valves associated with bed C except valve 1C are closed (valves 2C, 3C, 4CD and 6C). Valve 23 throttles and limits the flow of purge gas so that bed C remains at substantially one atmosphere pressure.

Time 11–12: At the end of the purge step for third Bed C, first bed A will have depressurized to about 17½ p.s.i.g. At this point, valve 1C closes so that the continued flow of gas from bed A into bed C is bottled up. The continued flow of gas cannot be carried by the purge cross-over (conduit 21, valves 23 and 19) because the regulator valve 23 is set to terminate the purge flow when the pressure in bed A has dropped to the predetermined lower limit for the withdrawal of purge gas (e.g. 17½ p.s.i.g.). Therefore, the continued gas flow for countercurrent pressurization of bed C is shunted through conduit 40 by opening valve 41 and closing valve 23. Valve 42 in series with valve 41 is preset to limit the flow rate of repressurization gas. The beds A and C equalize at a lower intermediate pressure of about 8 p.s.i.g.

Time 12–13: First bed A is now countercurrently depressurized to essentially one atmosphere pressure as the lowest pressure of the process by closing valves 5A and 41 and opening valve 3A. Valve 26 in the waste conduit 12 also closes forcing the blowdown gas through flow restrictive device 25.

Time 13–17: Purge gas for first bed A is obtained from concurrent depressurization of fourth bed D which is between its two pressure equalization steps. Valves 5A, 20 and 5D open to permit this flow countercurrent to the previously flowing feed gas. At this time, all valves associated with bed D other than valve 5D are closed. Valve 24 throttles and limits the flow of purge gas so that bed A remains at substantially one atmosphere. Valve 26 in the waste conduit 12 is also reopened so as to minimize flow resistance to the low pressure purge gas.

Time 17–18: Bed A is now cleaned and ready to be repressurized countercurrently with product-quality gas. The initial phase of repressurization is accomplished by continued introduction of void space gas from fourth bed D. Valves 3A and 20 close and valve 41 opens to permit flow of gas from bed D to bed A. This partial countercurrent repressurization of first bed A continues until it is pressure equalized with fourth bed D at lower intermediate pressure, e.g., about 8 p.s.i.g. This is also the second or lower pressure equalization stage of bed D.

Tie 18–19: The next phase of bed A repressurization is accomplished by higher pressure equalization with second bed B which has just completed its adsorption step and is initially at full feed pressure. Valves 5A and 29 close and valve 4AB opens to admit void space gas discharged coccurrently from bed B. Valve 17 limits the flow to prevent bed fluidization. This further countercurrent repressurization of first bed A continues until it is pressure equalized with second bed B at higher intermediate pressure, e.g. about 32 p.s.i.g. This is the first or higher pressure equalization stage of bed B.

Time 19–24: The final phase of bed A repressurization to substantially feed pressure is accomplished with product gas discharged from third bed C through manifold 11, which gas is preliminarily flow-regulated by device 28 into repressurization manifold 29. Valve 4AB is closed and 6A opened to admit the regulated product gas into bed A. In preferred practice, this final phase of repressurization using product gas commences at minute 18 and proceeds simultaneously with the first higher pressure equalization step of bed B. Such overlapping of the two sources of repressurization gas is advantageous because it smooths the internal utilization of product and avoids fluctuations of product flow and pressure. When bed A reaches the pressure level of manifold 29, valve 6A is closed and the bed is again ready to receive feed gas for separation.

The above described cycle for bed A is typical for beds B, C and D. As represented in FIG. 2, the time sequence for placing beds on-stream for adsorption is A, D, B and C, i.e., the first, fourth, second and third beds.

When only a single equalization step is used, the source bed is initially at maximum (feed) pressure and the receiving bed is initially at minimum (purge) pressure. At first glance, one might logically conclude that equalization from such initial conditions should achieve maximum gas transfer and hence maximum recovery of void space gas. However, it has been unexpectedly discovered that this does not occur. Conducting the pressure equalization in two steps with two different alternate beds allows more of the void space gas to be utilized for repressurization. Hence, less product gas is required for repressurization and less residual void space gas remains in the bed to be blown down countercurrently to waste.

Figure 3:
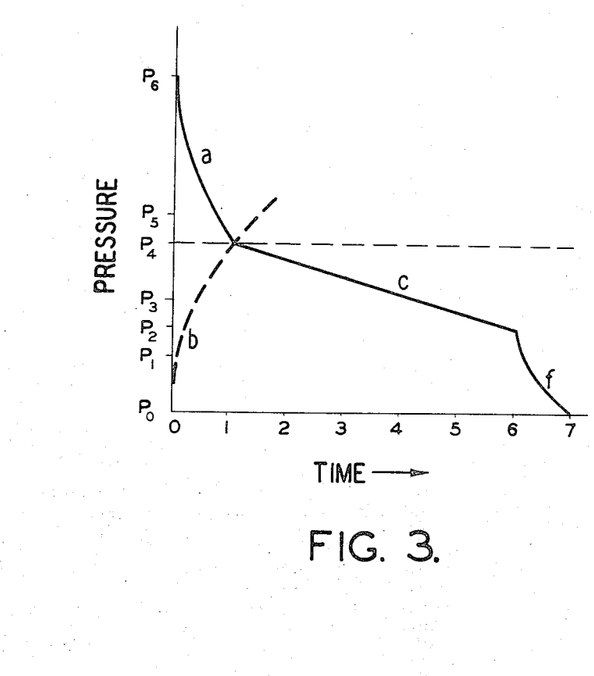
FIG. 3 is a graph showing the pressure-versus-time relationship for single stage pressure equalization characteristic of the prior art.

More void space gas is transferred and utilized when two equalization steps are conducted because the source bed ultimately equalizes to lower pressure and the receiving bed equalizes to higher pressure. This will be more clearly understood by reference to FIGS. 3 and 4 which graphically illustrate the pressure changes associated with single stage and two stage pressure equalization respectively. In FIG. 3 curve $a$ is the pressure in the source bed, and curve $b$ the pressure in the receiving bed. The source and receiving beds are initially at pressures $P_6$ and $P_0$, respectively, and they equalize at pressure $P_4$. After single step pressure equalization, the source bed continues to decline in pressure (curve $c$) as gas is withdrawn for purging an alternate bed. After 6 minutes pressure $P_2$ is reached and the source bed is then blown down countercurrently to one atmosphere (curve $f$).

Figure 4:
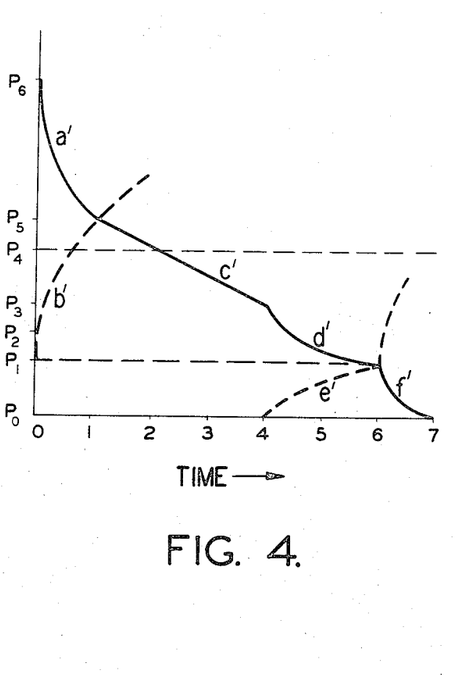
FIG. 4 is a graph showing the pressure-versus-time relationship for two stage pressure equalization characteristic of this invention.

Referring now to FIG. 4, it is seen that when the first higher pressure equalization step is initiated, the receiving bed is at substantial pressure $P_1$ above $P_0$. This is because the receiving bed has previously been partially repressurized to lower intermediate pressure $P_1$ by second stage presure equalization gas from another bed. Accordingly, the terminal pressure of the first higher stage pressure equalization is at a higher level $P_5$ (heretofore identified as higher intermediate pressure) than the level $P_4$ attained when the receiving bed is initially at $P_0$, the lowest pressure of the process. The final increment of repressurization of the receiving bed (to $P_6$) must be conducted with product, and clearly less product is required for repressurization from $P_5$ to $P_6$ than from $P_4$ to $P_6$.

After first higher stage pressure equaliziation to $P_5$, the source may be cocurrently depressurized with the release of void space gas which is used as purge gas for another adsorbate loaded bed. During this step the source bed pressure level drops to $P_3$ (curve $c'$). Now the source bed is again pressure equalized to a second lower intermediate pressure $P_1$ with another receiving bed initially at lowest pressure $P_0$. The varying pressures in the source and another receiving bed are represented by curves $d'$ and $e'$ respectively. Since the source bed is initially at a relatively low pressure $P_3$ for this second pressure equalization, the terminal pressure $P_1$ is also very low. It is important to recognize that this terminal pressure $P_1$ at which recovery of void space gas is completed is significantly lower than the terminal pressure $P_2$ of the single step pressure equalization of the prior art (see FIG. 3). These terminal pressures $P_1$ and $P_2$ indicate the relative quantities of residual void space gas which must be blown down countercurrently to waste in the two processes. Clearly less void space gas is wasted in blowing down from $P_1$ (FIG. 4) than from $P_2$ (FIG. 3).

Figure 5:
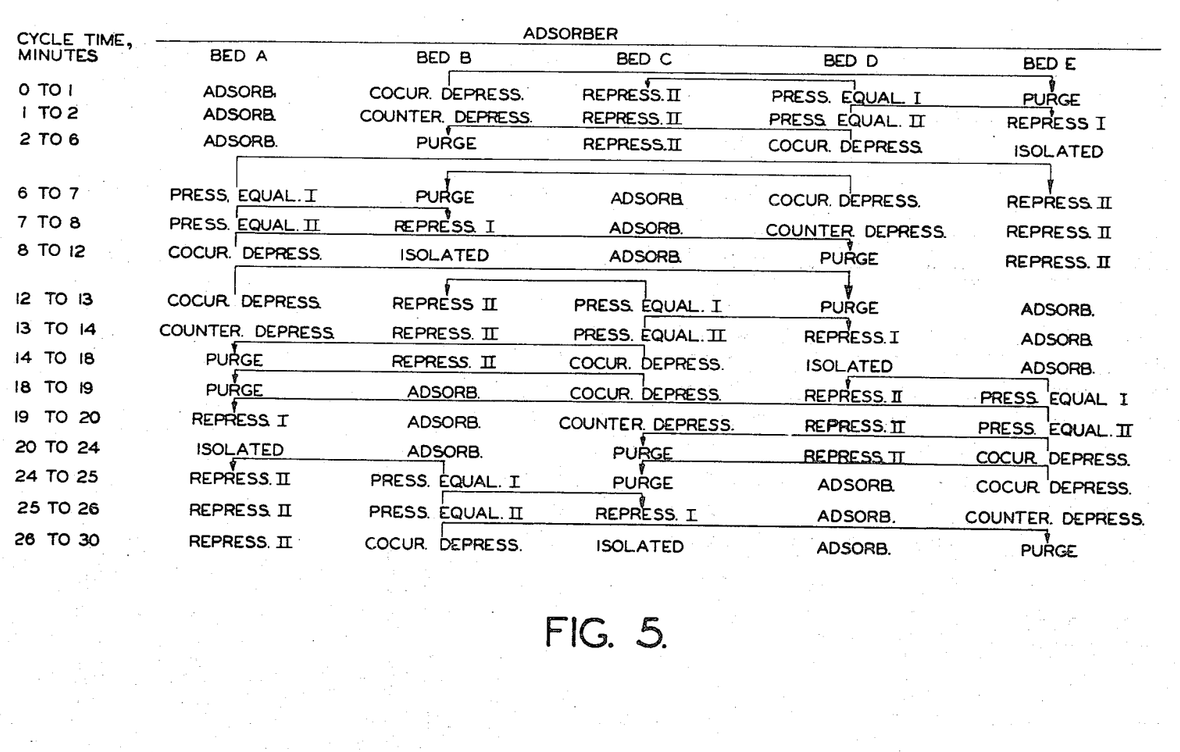
FIG. 5 is a preferred cycle and time program for various steps of a five bed embodiment of this process.

Although the invention has heretofore been described in terms of a four bed system, it is also applicable to more than four beds. FIG. 5 illustrates a suitable 30-minute cycle sequence chart for a five-bed system, the main difference being the placement of the cocurrent depressurization step after instead of between the two pressure equalization steps. This latter sequence as employed in FIG. 2 is more convenient, and five beds are needed in FIG. 5 to match the source and receiving beds for the cocurrent blowdown gas when it is released after the second lower pressure equalization. Moreover, a brief period of isolation of the receiving bed is necessary after its partial repressurization and while it "waits" for a source bed to release first higher pressure equalization gas. An advantage of this embodiment over the FIG. 2 embodiment is that the terminal pressure of the first higher pressure equalization step is higher so that less product is needed for final repressurization before return to the adsorption step.

In the five-bed embodiment of the two-stage pressure equalization, the first bed upon completion of adsorption is first pressure equalized at higher intermediate pressure with a fifth bed at higher intermediate pressure by releasing void space gas from the first bed discharge end and flowing same to the discharge end of the fifth bed having been partially repressurized to lower intermediate pressure and isolated. The first bed is then again pressure equalized at lower immediate pressure with a second bed by releasing additional void space gas from the first bed discharge end and flowing same to the second bed immediately after purging the one component adsorbate therefrom at the lowest pressure of the process. The first bed is next cocurrently depressurized by releasing further void space gas from the discharge end, throttling same to the lowest pressure level of the process and flowing the gas into the discharge end of a fourth bed partially loaded with the one component adsorbate for countercurrent purging thereof.

In the succeeding countercurrent depressurization step the desorbate is passed from the first bed to the waste manifold for discharge from the system. Next, the first bed is countercurrently purged at its lowest pressure level with void gas discharged from the third bed during its cocurrent depressuization step. The cleaned first bed is now countercurrently partially repressurized with the second lower pressure equalization gas from the fifth bed, and then isolated from the system. When the first higher pressure equalization gas from the second bed becomes available, it is used to further countercurrently repressurize the first bed. Repressurization is completed by product introduction from the fourth bed.

Figure 6:
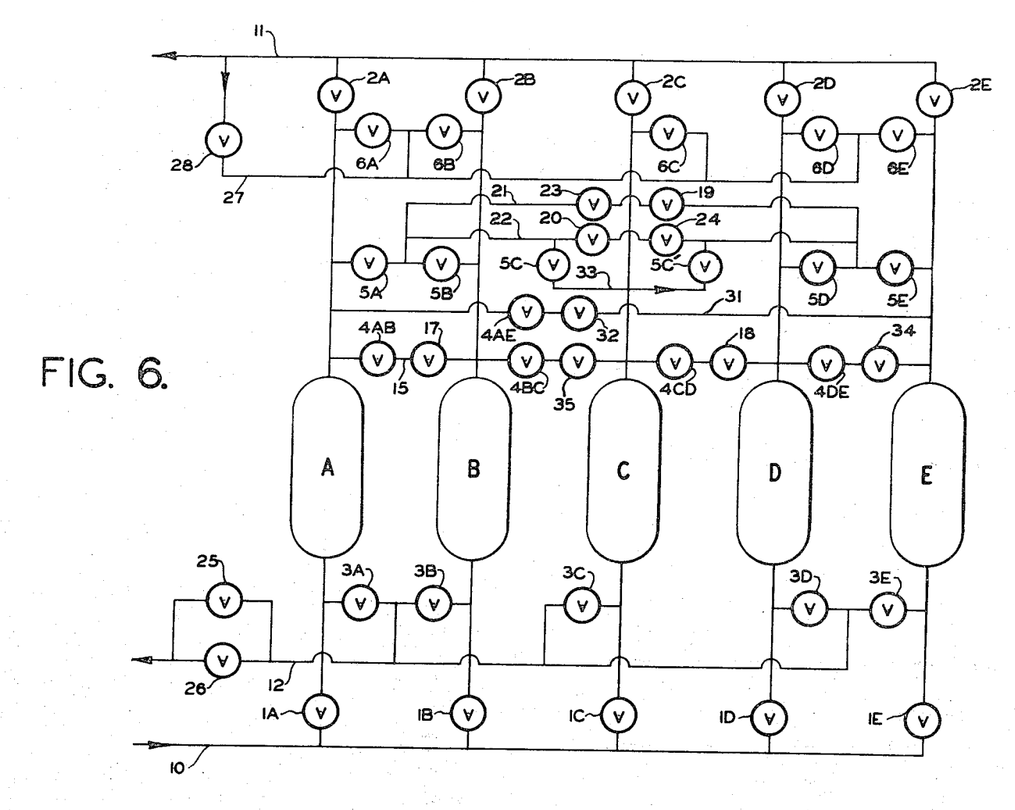
FIG. 6 is a schematic flowsheet of apparatus suitable for practicing the inventive process with five adsorbent beds.

FIG. 6 illustrates valving and piping for practicing the five-bed embodiment with the flows of FIG. 5. The cycle for first bed A (typical for all beds) is as follows:

Time 1–6: Bed A is on adsorption. Only valves 1A and 2A associated with bed A are open.

Time 6–7: Bed A first pressure equalizes with fifth bed E at higher intermediate pressure. Valves 1A and 2A close, and valve 4AE opens for flow through conduit 31 to the discharge end of fifth bed E having previously been partially repressurized to lower intermediate pressure and isolated. All other valves associated with bed E are closed, except valve 6E.

Time 7–8: Bed A second pressure equalizes with second bed B at lower intermediate pressure. Valve 4AE closes and valve 4AB opens for flow through conduit 15 to the discharge end of second bed B immediately after purging the one component adsorbate therefrom at the lowest pressure. All other valves associated with bed B are closed.

Time 8–13: Bed A depressurizes cocurrently and supplies gas for countercurrently purging fourth bed D. Valve 4AB closes and valves 5A, 23 and 5D open. Preset throttle valve 19 in series with valve 23 limits the flow rate and pressure to bed D.

Time 13–14: Bed A is blown down countercurrently to waste. Valves 5A, 23 and 5D close. Valve 3A opens, and valve 26 closes to force the blowndown gas carrying part of the desorbed one component through the bed inlet end and flow limiting valve 25. This flow continues until bed A is at the lowest pressure of the process.

Time 14–19: Bed A is countercurrently purged with cocurrent depressurization gas from third bed C. Valves 5C and 5A open in conduits 33 and 22 for this gas flow. Valve 26 also opens to minimize flow restriction to the low pressure purge.

Time 19–20: Bed A begins countercurrent partial repressurization by pressure equalization with fifth bed E (which has already completed its first higher pressure equalization with bed D). Valves 3A, 5A and 5C close and valve 4AE in conduit 31 opens for flow until the two beds equalize lower intermediate pressure.

Time 20–24: Bed A is isolated at the lower intermediate pressure waiting for an alternate bed to complete its adsorption stroke. Valve 4AE is closed.

Time 24–25: Bed A is further countercurrently repressurized by introducing void space gas from second bed B until the beds are pressure equalized at higher intermediate pressure as the first higher pressure equalizing step of second bed B. Valve 4AB opens to accommodate this flow through conduit 15. Bed A also preferably receives product repressurization gas during this period from fourth bed D through product repressurization manifold 27. Valve 6A opens to admit this flow.

Time 25–30: Bed A completes repressurization with product gas from fourth bed D through valve 6A. Valve 4AB is closed. Bed A is now cleaned, repressurized and again ready to receive feed gas for separation repeating the aforedescribed cycle step sequence. The same sequence is consecutively repeated with the third bed C, fifth bed E, second bed B and fourth bed D as illustrated by FIG. 5.

In the aforedescribed embodiments, the adsorption front and the corresponding adsorbent bed volume (hereinafter referred to as the mass transfer zone) is normally retained in the bed during pressure equalization and cocurrent depressurization, so that the released void space gas contains very little adsorbate and may be introduced to the product end of the receiving beds without contamination of this critical zone. However, this mode of operation requires a longer bed to carry each increment of gas separated and withdrawn cocurrently; the additional amount of adsorbent so required is increased by the lower adsorbate capacity at reduced pressures.

A particular size adsorbent bed may be used more efficiently by decreasing the cycle time, so that the adsorbent is reloaded more frequently. However, the length of the mass transfer zone is independent of cycle time, and if bed size is reduced by shortening the cycle time a retained adsorption front will occupy a larger fraction of the total bed volume. Since the mass transfer zone is not fully loaded with adsorbate, it will often contain relatively more product component than does an equal volume of the bed in the equilibrium zone. Thus, when the mass transfer zone is retained in the bed and subsequently blown down countercurrently, its product content is wasted and the fraction of product lost in this manner tends to become greater as the cycle time and bed length are shortened.

One embodiment of this invention affords recovery of the product component in the gas within the mass transfer zone. The first higher pressure equalization step and the cocurrent depressurization step are conducted so that the adsorption front is still entirely within the bed on completion of these steps. Accordingly, the released gas is at high product purity and is introduced into the product or discharge end of the receiving bed. However, the adsorption front is allowed to break through the discharge end on the second lower pressure equalization step. Although this released gas is only partially separated into adsorbate and product, it is nevertheless higher in product than the feed gas, and is introduced to the feed end of the appropriate receiving bed ("other bed" using the terminology of the Summary or "third bed" using the terminology of the four-bed embodiment). Accordingly, the product value of the mass transfer zone gas is recovered without contaminating the product end of the purged bed. This embodiment permits higher product recover and shorter adsorption beds.

Figure 7:
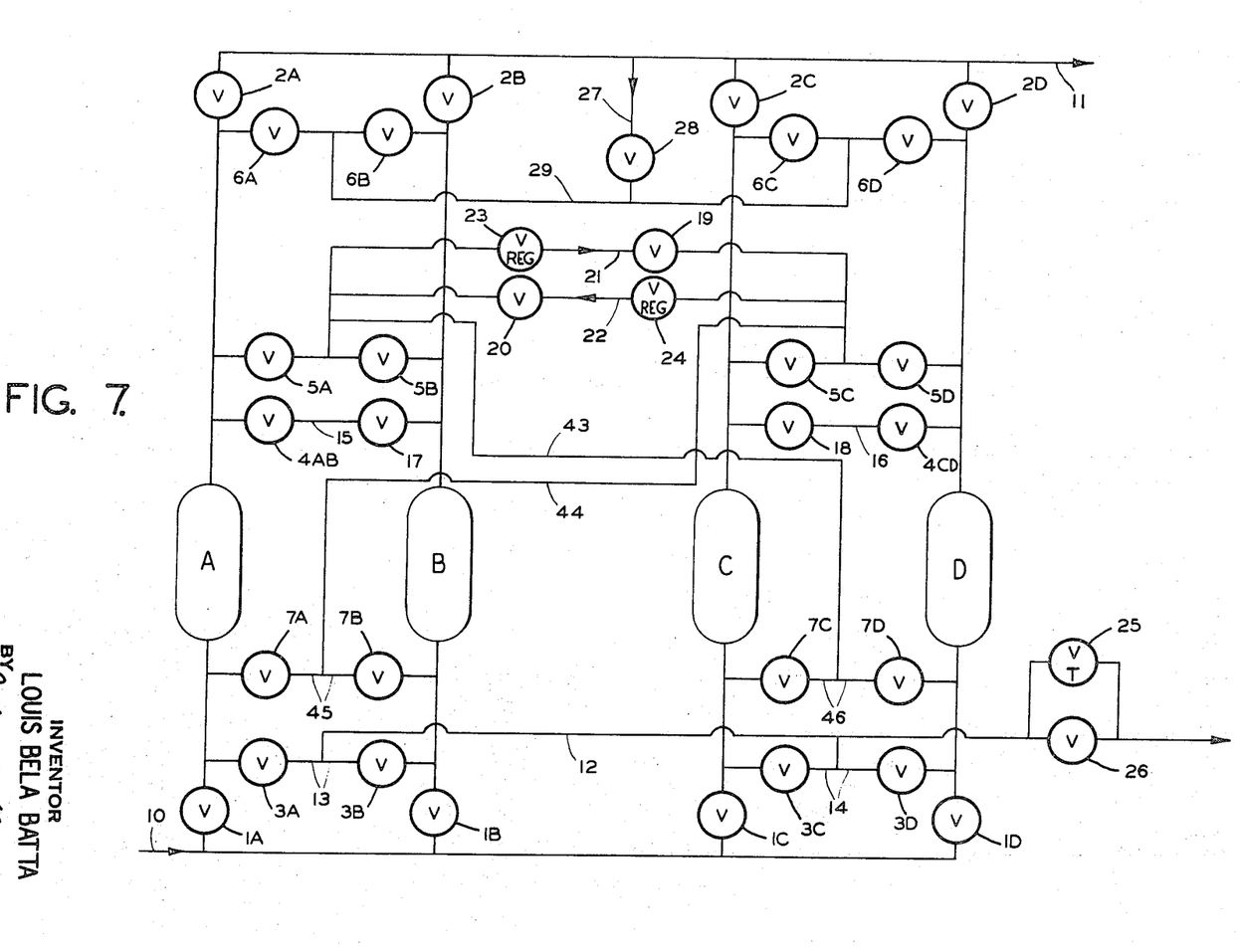
FIG. 7 is a schematic flowsheet of a four bed embodiment piped for feed end repressurization during the second lower pressure equalization.

The cycle step sequence of FIG. 2 may be used to practice this embodiment with certain piping modifications to the FIG. 1 system as depicted in FIG. 7. Cross-over conduits 43 and 44 carry the released gas from the second lower pressure equalization steps of beds A and B to beds C and D, and from the latter to the former, respectively. At the inlet end four additional sequencing valves 7A, 7B, 7C and 7D are provided in conduits 45 and 46 joining beds AB and CD, respectively.

The FIG. 7 system may be operated in the same manner as the FIG. 1 system through time period 7–11. At this point first bed A has cocurrently depressurized to about 17½ p.s.i.g. in supplying purge gas for third bed C. Valve 1C closes thereby dead-ending the continued flow of gas from bed A to bed C. The adsorption or mass transfer front in bed A has proceeded to the end of that bed and breakthrough is imminent. Valve 19 closes and valve 7C opens, establishing flow communication between the product end of bed A and the feed end of third bed C. As before the two beds pressure equalize at about 8 p.s.i.g. and during this step the gas from the bed A mass transfer zone is directed to third bed C and the product content of this stream progressively declines from near-product purity to near-feed composition. The beds are preferably sized and operated so that the terminal portion of the second lower pressure equalization gas flow is still somewhat richer in product than the feed.

This invention and its advantages are illustrated by the following examples.

EXAMPLE I

A four-bed system in accordance with FIG. 1 was used to separate air following the cycle sequence of FIG. 2. Each of the four beds consisted of two sections in series flow sequence, and contained a total of about 118 pounds of 1/16-inch diameter calcium zeolite A molecular sieve pellets in a combined packed section 6 inches inside diameter and 144 inches long for selective adsorption of nitrogen.

The feed stream was compressed air at 55 p.s.i.g. and about 85° F., and was not pretreated for removal of minor impurities. Its $CO_2$ content was normal (about 300 p.p.m.) and moisture content varied between 600 and 1000 p.p.m. with occasional peaks to 2000 p.p.m.

The total cycle time was shortened to 12 minutes (as compared with the 24 minutes of the FIG. 2 cycle) with 3 minutes for adsorption, 25 seconds for first higher pressure equalization, 2 minutes-10 seconds for cocurrent depressurization, 25 seconds for second lower pressure equalization, 25 seconds for countercurrent depressurization or blowdown, 2 minutes-10 seconds for purge, and 3 minutes-25 seconds for repressurization. Table I summarizes the results of two runs conducted at different feed rates:

TABLE I

| | Test I | Test II |
|---|---|---|
| Feed rate (at 1 atm., 60° F.), c.f.h | 362 | 372 |
| Terminal pressures: | | |
| Equalization I, p.s.i.g | 32 | 32 |
| Cocurrent depressurization, p.s.i.g | 17½ | 18 |
| Equalization II, p.s.i.g | 8 | 8½ |
| Purge, p.s.i.g | 0 | 0 |
| Product: | | |
| Withdrawal rate (at 1 atm., 60° F.), c.f.h | 31.4 | 38.0 |
| Composition: | | |
| Argon, percent | 4.0 | 3.92 |
| Nitrogen | ¹160 | ²,27 |
| Oxygen, percent | 96.0 | 95.81 |
| Fraction of oxygen in feed recovered in product, percent | 39.9 | 45.6 |

¹ Parts per million.
² Percent.

By comparison, it is estimated (based on extrapolations from operation of commercial sized plants) that an adsorption system employing single step pressure equalization can produce equal purity but at about one half the oxygen recovery achieved with this invention. Other adsorption systems for air separation which do not separate and recover the void space gas have been alleged to achieve recovery equivalent to that of Example I but only at low purity, e.g., 30–40% oxygen. Higher purities have been reported by the prior art, e.g., 85% oxygen product, but the reported recovery is only about 1% of the feed.

EXAMPLE II

The same four-bed system used to separate air as described in Example I was also used to selectively adsorb nitrogen from admixture with hydrogen. The feed gas comprising 75% $H_2$, 25% $N_2$ and less than 500 p.p.m. $NH_3$ was supplied at 40° F. and 230 p.s.i.g. Two processes were used: (a) the two-stage pressure equalization of this invention following the cycle sequence of FIG. 2 but with a total cycle time of 28 minutes, and (b) a single stage pressure equalization process according to the Wagner invention in which the first bed was equalized with the second bed, followed by the consecutive steps of cocurrent depressurization, countercurrent depressurization, countercurrent purging, and countercurrent repressurization using a 28-minute cycle. That is, the only difference between the two processes was the employment of two step pressure equilization in (a) and single step pressure equalization in (b). The data from these processes is summarized in Table II as follows:

TABLE II

| | Process (a) | Process (b) |
|---|---|---|
| Feed rate (at 1 atm., 60° F.), c.f.h | 868 | 921 |
| Terminal pressures: | | |
|   Equalization I, p.s.i.g | 133 | 113 |
|   Concurrent depressurization, p.s.i.g | 83 | 63 |
|   Equalization II, p.s.i.g | 41 | None |
|   Purge, p.s.i.g | 0 | 0 |
| Product: | | |
|   Withdrawal rate (at 1 atm., 60° F.), c.f.h | 519 | 514 |
|   Composition | 99.999% $H_2$ | 99.99% $H_2$ |
| Fraction $H_2$ in feed recovered in product, percent | 79.7 | 74.4 |

It is apparent from Table II that this invention provided 5.3% higher product recovery than the prior art single stage pressure equalization process. Moreover, if the duration of the process (a) adsorption step were extended (while retaining the other cycle steps at the same time period) to reduce the product purity to the same as process (b), i.e., 99.99%, it is estimated that this invention would provide about 7% higher product recovery.

Although certain embodiments have been described in detail, it will be appreciated that other embodiments are contemplated along with modifications of the disclosed features, as being within the scope of the invention.

For example, although the step of countercurrent depressurization or blowdown has been described as following the two pressure equalization steps and the cocurrent depressurization, the latter may be continued to the lowest pressure level of the process. Under these circumstances the countercurrent depressurization is not employed and all of the adsorbate is removed during the succeeding purge step. In this embodiment the feed pressure may be adjusted downwardly so that the void space gas left in the beds after adsorption is just sufficient to meet system requirements for pressure equilization and purge. The adsorbent beds are relatively longer to provide sufficient unused length to contain the adsorption front at the relatively low loading corresponding to the terminal pressure. At least five beds are required so that the two pressure equalization steps are sequential and the cocurrent depressurization is the last step before lowest pressure purging.

It should also be understood that while complete pressure equalization between two adsorbent beds is desirable and should be closely approached, it is not practical to delay the cycle until the ΔP driving force has completely vanished and until no gas flow exists between the beds being equalized. Accordingly the term "pressure equalization" is used in a practical rather than a theoretical sense. For example, in processes employing low pressure feeds (e.g., air at 55 p.s.i.), the pressures in the source and receiving beds after equalization will be within less than 1 p.s.i. of each other. In processes using higher feed pressures (e.g., crude hydrogen at 250 p.s.i.), the pressures after equalization will be on the order of 2–5 p.s.i. within each other.

What is claimed is:

1. In a pressure swing process for separating gas mixtures by selectively adsorbing at least one gas component in each of at least four adsorption zones by the steps of introducing said gas mixture to the inlet end of a first adsorbent bed at first higher superatmospheric pressure and discharging unadsorbed product effluent from the discharge end, releasing void space gas from the first bed discharge end and introducing the so-released gas to the discharge end of a second adsorbent bed previously cleaned of said one gas component and initially at a lower pressure until the first and second beds are pressure equalized at intermediate pressure, releasing further void space gas from the first bed discharge end for cocurrent depressurization thereof and introducing such gas at said lowest pressure to the discharge end of another adsorbent bed partially loaded with said one component for purging thereof, countercurrently purging said first bed by introducing cocurrent depressurization gas from still another bed at said lowest pressure to the first bed discharge end for desorption of said one component and removal through the first bed inlet end, and countercurrently repressurizing the purged first bed to higher pressure by introducing void space gas from said second bed and product effluent from said other bed to the discharge end: the improvement comprising first pressure equalizing said first bed with a different bed at higher intermediate pressure by releasing void space gas from the first bed discharge end and flowing same to the different bed discharge end having previously been partially repressurized to lower intermediate pressure, and second pressure equalizing said first bed with a still different bed at said lower intermediate pressure by releasing additional void space gas from the first bed discharge end and flowing same to said still different bed immediately after purging said one component therefrom at said lowest pressure.

2. A process according to claim 1 in which said further void space gas is released from the first bed discharge end for said purging of said other adsorbent bed after said first pressure equalizing and before said second pressure equalizing.

3. A process according to claim 1 in which said further void space gas is released from the first bed discharge end for said purging of said other adsorbent bed after said second pressure equalizing.

4. In a process for separating gas mixture by selectively adsorbing at least one gas component in an adsorption zone at higher pressure and desorbing the selected component by pressure reduction to lower pressure, the improvement comprising the steps of:

(a) providing four beds of selective adsorbent material each with inlet and discharge ends;

(b) introducing said gas mixture to the inlet end of a first bed at first highest superatmospheric pressure for flow therethrough with selective adsorption of at least one component and discharge of unadsorbed product effluent from the discharge end, continuing such flow so that an adsorption front of said one component is established at said inlet end and moves progressively toward the discharge end, and terminating such flow when said adsorption front is entirely within said first bed so that the bed remains filled with void space gas at said first highest pressure;

(c) first pressure equalizing said first bed with a second bed at higher intermediate pressure by releasing void space gas from the first bed discharge end and flowing same to the discharge end of the second bed having previously been partially repressurized to lower intermediate pressure;

(d) cocurrently depressurizing said first bed by releasing further void space gas from the discharge end, throttling such gas to a lowest pressure and flowing same into the discharge end of a third bed partially loaded with said one component for countercurrent purging thereof;

(e) second pressure equalizing said first bed with said third bed at lower intermediate pressure by releasing additional void space gas from the first bed discharge end and flowing same to the third bed immediately after purging said one component therefrom at said lowest pressure;

(f) reducing the inlet end pressure of said first bed thereby countercurrently desorbing part of the adsorbed one component and discharging same through said inlet end, and continuing the discharge until said first bed is at said lowest pressure;

(g) introducing cocurrent depressurization gas from a fourth adsorbent bed at said lowest pressure to the discharge end of said first bed for flow therethrough countercurrent to the previously flowing gas mixture so as to purge at least part of the remaining adsorbed one component and remove same through the bed inlet end;

(h) introducing void space gas from said fourth adsorbent bed to said first bed for partial repressurization thereof until said first and fourth beds are pressure equalized at lower intermediate pressure as the fourth bed second pressure equalizing;

(i) introducing void space gas from said second bed to the first bed discharge end for further repressurization thereof until said first and second beds are pressure equalized at higher intermediate pressure as the second bed first pressure equalizing;

(j) introducing product effluent from said third bed to the first bed discharge end for final countercurrent repressurization thereof to pressure above said higher intermediate pressure;

(k) reintroducing said gas mixture to the inlet end of the repressurized first bed in a manner analogous to step (b) and thereafter consecutively repeating steps (c) through (j); and (l) consecutively following the sequence of steps (b) through (k) with the fourth, second and third beds in accordance with the flow cycle sequence of FIG. 2.

5. In a process for separating gas mixtures by selectively adsorbing at least one component in an adsorption zone at higher pressure and desorbing the selected component by pressure reduction to lower pressure, the improvement comprising the steps of:

(a) providing five beds of selective adsorbent material each with inlet and discharge ends;

(b) introducing said gas mixture to the inlet end of a first bed at first highest superatmospheric pressure for flow therethrough with selective adsorption of at least one component and discharge of unadsorbed product effluent from the discharge end, continuing such flow so that an adsorption front of said one component is established at said inlet end and moves progressively toward the discharge end, and terminating such flow when said adsorption front is entirely within said first bed so that the bed remains filled with void space gas at said first highest pressure;

(c) first pressure equalizing said first bed with a fifth bed at higher intermediate pressure by releasing void space gas from the discharge end and flowing same to the discharge end of the fifth bed having previously been partially repressurized to lower intermediate pressure and isolated; and (d) second pressure equalizing said first bed with a second bed at lower intermediate pressure by releasing additional void space gas from the first bed discharge end and flowing same to the second bed immediately after purging said one component therefrom at said lowest pressure;

(e) cocurrently depressurizing said first bed by releasing further void space gas from the discharge end, throttling such gas to a lowest pressure and flowing same into the discharge end of a fourth bed partially loaded with said one component for countercurrent purging thereof;

(f) reducing the inlet end pressure of said first bed thereby countercurrently desorbing part of the adsorbed one component and discharging same through said inlet end, and continuing the discharge until said first bed is at said lowest pressure;

(g) introducing cocurrent depressurization gas from a third bed at said lowest pressure to the discharge end of said first bed for flow therethrough countercurrent to the previously flowing gas mixture so as to purge at least part of the remaining adsorbed one component and remove same through the bed inlet end;

(h) introducing void space gas from the fifth bed to the discharge end of said first bed for partial countercurrent repressurization thereof until said first and fifth beds are pressure equalized at lower intermediate pressure as the fifth bed second pressure equalizing;

(i) isolating the inlet and discharge ends of said first bed and at said lower intermediate pressure of step (h);

(j) introducing void space gas from said second bed to the first bed discharge end for further countercurrent repressurization thereof until said first and second beds are pressure equalized at higher intermediate pressure as the second bed first pressure equalizing;

(k) introducing product effluent from said fourth bed to the first bed discharge end for final countercurrent repressurization thereof to third pressure above said second pressure;

(l) reintroducing said gas mixture to the inlet end of the repressurized first bed in a manner analogous to step (b) and thereafter consecutively repeating steps (c) through (k); and (m) consecutively following the sequence of steps (b) through (k) with the third, fifth, second and fourth beds in accordance with the flow cycle sequence of FIG. 5.

6. A process according to claim 1 in which hydrogen is the major component of said gas mixture and methane is said one component.

7. A process according to claim 1 in which air comprises said gas mixture, nitrogen is said one component and calcium zeolite A is said adsorbent.

8. A process according to claim 1 in which the gas mixture introduction to the first bed inlet end and said first pressure equalizing are terminated when an adsorption front of said one component is entirely within said first bed, said second pressure equalizing is continued at least until said adsorption front breaks through the first bed discharge end, and said additional void space gas released therefrom is introduced at the feed inlet end of said other bed.

9. A process according to claim 4 in which said first pressure equalizing is terminated when an adsorption front of said one component is entirely within said first bed, said second pressure equalizing is continued at least until said adsorption front front breaks through the first bed discharge end, and said additional void space gas released therefrom is introduced at the feed inlet end of said third bed.

References Cited

UNITED STATES PATENTS 3,430,418  3/1969  Wagner ______________ 55—25

REUBEN FRIEDMAN, Primary Examiner

C. N. HART, Assistant Examiner

U.S. Cl. X.R.

55—62, 75